(12) United States Patent
Pignataro et al.

(10) Patent No.: US 10,291,480 B2
(45) Date of Patent: May 14, 2019

(54) FOG-BASED HYBRID SYSTEM FOR OPTIMAL DISTRIBUTION OF ANOMALY DETECTION AND REMEDIATION SERVICES

(71) Applicant: Cisco Technology, Inc., San Jose, CA (US)

(72) Inventors: Carlos M. Pignataro, Raleigh, NC (US); Omar Santos, Raleigh, NC (US); David C. White, Jr., Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 15/083,990

(22) Filed: Mar. 29, 2016

(65) Prior Publication Data

US 2017/0288988 A1 Oct. 5, 2017

(51) Int. Cl.
*G06F 15/173* (2006.01)
*H04L 12/24* (2006.01)
*H04L 29/06* (2006.01)
*H04W 12/12* (2009.01)
*H04W 84/18* (2009.01)

(52) U.S. Cl.
CPC ........ *H04L 41/142* (2013.01); *H04L 41/0631* (2013.01); *H04L 63/1425* (2013.01); *H04W 12/12* (2013.01); *H04L 41/16* (2013.01); *H04W 84/18* (2013.01); *Y04S 40/166* (2013.01)

(58) Field of Classification Search
None
See application file for complete search history.

(56) References Cited

U.S. PATENT DOCUMENTS

| | | | | |
|---|---|---|---|---|
| 6,333,936 B1 * | 12/2001 | Johansson | ............... | H04J 13/16 370/449 |
| 7,454,427 B2 | 11/2008 | Jackson | | |
| 8,289,968 B1 * | 10/2012 | Zhuang | ............... | H04L 61/2517 370/252 |
| 9,032,077 B1 * | 5/2015 | Klein | ............... | H04L 29/08 370/395.21 |
| 2007/0143471 A1 * | 6/2007 | Hicks | ............... | H04L 41/0853 709/224 |
| 2008/0162717 A1 * | 7/2008 | Tsai | ............... | H04L 45/02 709/232 |

(Continued)

OTHER PUBLICATIONS

Agarwal et al. "An architecture for elastic resource allocation in Fog Computing" vol. 6, No. 2; Apr.-Sep. 2015; pp. 1-7.

(Continued)

*Primary Examiner* — Umar Cheema
*Assistant Examiner* — Gregory P Tolchinsky
(74) *Attorney, Agent, or Firm* — Behmke Innovation Group LLC; James Behmke; Stephen D. LeBarron

(57) ABSTRACT

In one embodiment, a device in a network reserves first and second sets of local resources for an anomaly detection mechanism. The device reports the first set of local resources to a supervisory node in the network. The device applies one or more anomaly detection rules from the supervisory node using the first set of reserved resources. The device receives one or more anomaly detection rules from a peer node in the network. The device applies the one or more anomaly detection rules from the peer node using the second set of reserved resources.

15 Claims, 12 Drawing Sheets

(56) References Cited

U.S. PATENT DOCUMENTS

| | | | |
|---|---|---|---|
| 2013/0212212 A1 | 8/2013 | Addepalli et al. | |
| 2013/0212279 A1 | 8/2013 | Dutta et al. | |
| 2014/0108319 A1* | 4/2014 | Klauser | H04L 41/0816 706/47 |
| 2016/0050119 A1* | 2/2016 | Chhabra | H04L 43/0811 370/218 |
| 2016/0182639 A1* | 6/2016 | Hong | H04L 41/0853 709/201 |
| 2017/0048308 A1* | 2/2017 | Qaisar | H04L 67/1002 |
| 2018/0165111 A1* | 6/2018 | Feng | G06F 9/45558 |

OTHER PUBLICATIONS

Dsouza et al. "Policy-Driven Security Management for Fog Computing: Preliminary Framework and a Case Study" Laboratory of Security Engineering for Future Computing; IEEE IRI, Aug. 13-15, 2014.

* cited by examiner

FOG-BASED HYBRID SYSTEM FOR OPTIMAL DISTRIBUTION OF ANOMALY DETECTION AND REMEDIATION SERVICES

TECHNICAL FIELD

The present disclosure relates generally to computer networks, and, more particularly, to a fog-based hybrid system for the optimal distribution of anomaly detection and remediation services.

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

Anomaly detection seeks to ensure that a deployed network is operating as expected. This may entail detecting and remediating security threats, misbehaving or misconfigured devices, user policy violations, anomalous sensor readings, and the like. In traditional networks, anomaly detection is fairly straight-forward, as the devices in these networks have ample resources available to devote to anomaly detection. This allows the use of distributed anomaly detection approaches, as the devices themselves can perform the anomaly detection functions directly. However, devices in LLNs and other constrained networks likely do not have the resources to perform anomaly detection in addition to their primary functions. Accordingly, many anomaly detection approaches for constrained networks use a centralized model whereby the devices in the network pass status data to a more sophisticated, centralized anomaly detection device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network reserves first and second sets of local resources for an anomaly detection mechanism. The device reports the first set of local resources to a supervisory node in the network. The device applies one or more anomaly detection rules from the supervisory node using the first set of reserved resources. The device receives one or more anomaly detection rules from a peer node in the network. The device applies the one or more anomaly detection rules from the peer node using the second set of reserved resources.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
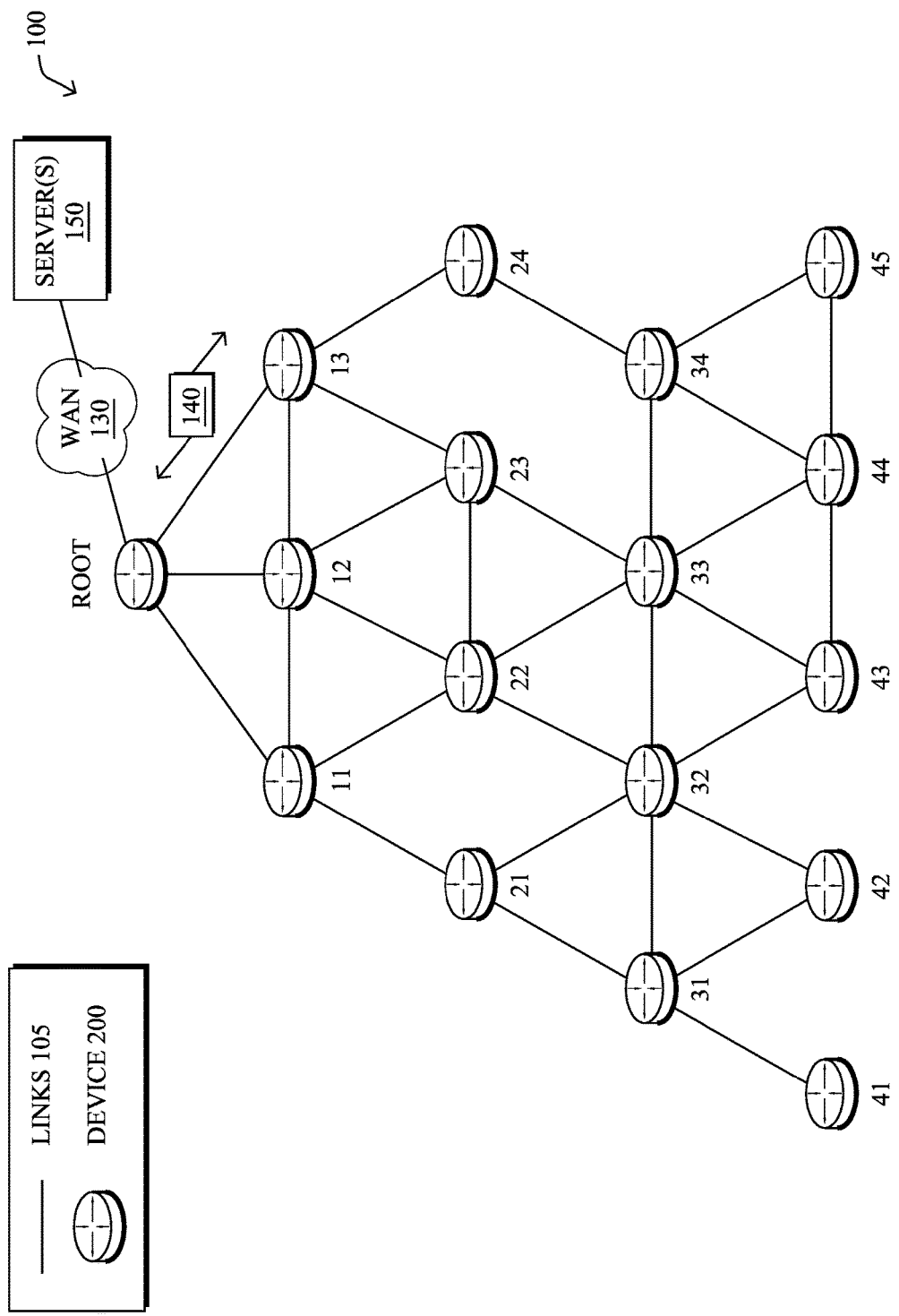
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Nodes 200 may communicate with any number of external devices, such as server(s) 150 via a network 130, which may be a WAN in some implementations. For example, a particular node 42 may send sensor data to server 150 for further processing, either via a local network or via a WAN. Server(s) 150 may include, but are not limited to, network management system (NMS) devices, supervisory control and data acquisition (SCADA) devices, enterprise resource planning (ERP) servers, other network administration devices, or the like.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
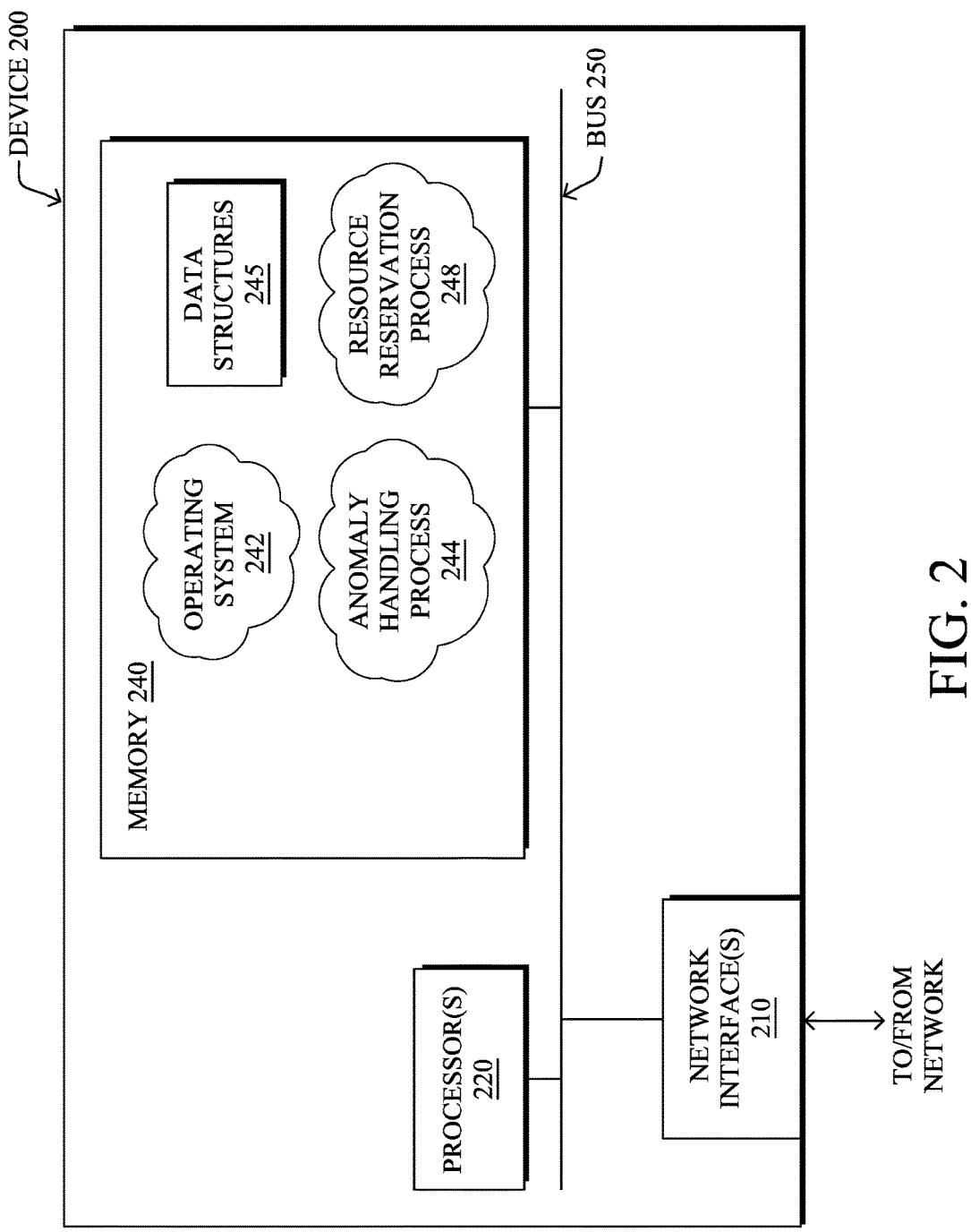
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, and powered by a power supply (e.g., a battery or other charge storage device, a power line, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an anomaly handling process 244, and an illustrative resource reservation process 248, as described herein. Note that while processes 244, 248 are shown in centralized memory 240, alternative embodiments provide for these processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Resource reservation process 248 may be configured to reserve local resources in device 200 for the execution of other processes, such as anomaly handling process 244. The reserved resources may include, for example, long-term and/or short-term memory reservations in memory 240, processing resources of processor(s) 220, and/or resources associated with network interface(s) 210 (e.g., communication queue priorities, devoted ports, etc.).

Anomaly handling process 244 includes computer executable instructions that, when executed by processor(s) 220, cause device 200 to perform anomaly detection and/or remediation functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of malware using unknown attack patterns (e.g., no static signatures) may lead to a change in the behavior of a host in terms of traffic patterns, graphs structure, etc. In some embodiments, anomaly handling process 244 may detect such anomalies using machine learning techniques capable of modeling subtle changes or correlation between changes (e.g., unexpected behavior) in a highly dimensional space. Example security threats may include, but are not limited to, zero-day malware, user policy violations, malware that attempts to perform data exfiltration, (distributed) denial of service (DoS) attacks, and the like.

Misbehaving devices: a device may misbehave in a network for a variety of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case), etc.

Dramatic behavioral changes: the introduction of a new networking or end-device configuration, or even the introduction of a new application, may lead to dramatic changes in the behavior of devices.

Misconfigured devices: a configuration change may also trigger an anomaly (e.g., a misconfigured ACL, route redistribution policy, routing policy, QoS policy maps, or the like, may have dramatic consequences such a traffic black-hole, QoS degradation, etc.).

In various embodiments, anomaly handling process 244 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, anomaly handling process 244 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

As noted above, the various constrains in LLNs and similar networks make distributed approaches to anomaly detection all but impossible in certain network implementations. Even if a fully-distributed approach were possible in a given network deployment, the anomaly detection capabilities at the individual node level would still be significantly limited. To accommodate the limited capabilities in LLNs and other constrained networks, some approaches to anomaly detection use a centralized approach whereby observation data regarding the network is fed to a single anomaly detector. However, even a centralized approach to anomaly detection and mitigation is not without tradeoffs in LLNs and other constrained networks. Notably, a centralized approach also increases the traffic load (e.g., to report the observations regarding the network). Further, distributed approaches tend to be more robust than centralized approaches, as different portions of a network may exhibit very different behaviors, making a one-size-fits-all approach difficult to apply.

Fog-Based Hybrid System for Optimal Distribution of Anomaly Detection and Remediation Services The techniques herein provide a hybrid approach to anomaly detection in which anomaly detection and remediation services are executed in the "fog" (e.g., on network edge devices, as opposed to datacenter/cloud-based servers or on the endpoint nodes themselves). In some aspects, a fog device may reserve resources for anomaly detection rules supplied by a supervisory node that oversees initial deployment of the anomaly detection mechanism. The device may also proactively reserve resources for peer-received anomaly detection rules that were flagged as "hot" by a peer. For example, a peer of the device may mark a rule as "hot," if the peer detects an anomaly using the rule. In turn, the peer node may distribute the "hot" rule to other peer fog devices for installation/application of the rule.

Specifically, according to one or more embodiments of the disclosure as described in detail below, a device in a network reserves first and second sets of local resources for an anomaly detection mechanism. The device reports the first set of local resources to a supervisory node in the network. The device applies one or more anomaly detection rules from the supervisory node using the first set of reserved resources. The device receives one or more anomaly detection rules from a peer node in the network. The device applies the one or more anomaly detection rules from the peer node using the second set of reserved resources.

Illustratively, the techniques described herein may be performed by hardware, software, and/or firmware, such as in accordance with the resource reservation process 248 which may contain computer executable instructions executed by the processor 220 (or independent processor of interfaces 210) to perform functions relating to the techniques described herein, e.g., in conjunction with anomaly handling process 244.

Operationally, the hybrid approach herein entails distributing anomaly detection rules to edge/fog nodes in the network. As used herein, an anomaly detection rule refers to any data that alters the functioning of the anomaly handling mechanism of a device. For example, an anomaly detection rule may include an anomaly signature (e.g., a traffic pattern indicative of a network attack, etc.), a machine-learning model (e.g., an ANN-is based anomaly detector, etc.), or any other data that the device can use to detect anomalous conditions. An anomaly detection rule may also be associated with one or more remediation actions. For example, if the device detects an anomaly using a particular rule, the device may make take the corresponding action (e.g., dropping an anomalous traffic flow, etc.). In some embodiments, an anomaly detection rule may also be unconditioned, meaning that the device is to take the corresponding action unconditionally. In other words, an unconditioned rule may simply be an instruction to the device to take a particular action, such as an anomaly remediation action.

Figure 3A:
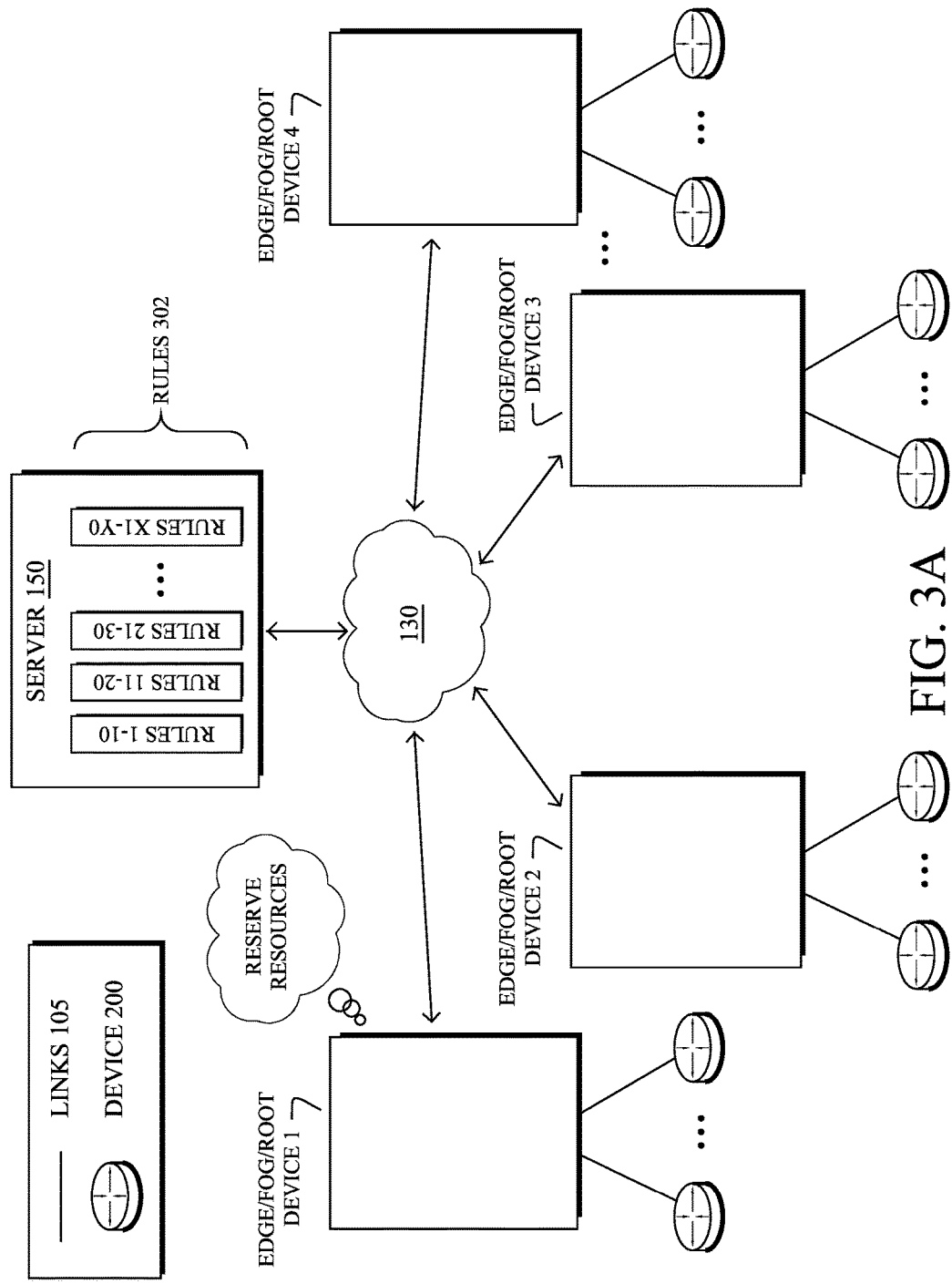
FIGS. 3A-3E illustrate examples of a supervisory device deploying anomaly detection rules to various network devices/nodes.

FIGS. 3A-3E illustrate examples of a supervisory device deploying anomaly detection rules to various network devices/nodes, according to various embodiments. As shown in FIG. 3A, assume that a supervisory node (e.g., one of servers 150) stores a plurality of anomaly detection rules 302. In some embodiments, the supervisory node may bundle rules 302 for deployment. For example, server 150 may select different sets of anomaly detection rules 302 (e.g., {1-10}, {11-20}, {21-30} . . . {X1, Y0}) based on the resources available at the target nodes, to ensure a diverse deployment of the rules throughout the network, etc.

Also as shown in FIG. 3A, any number of Edge/Fog/Root devices/nodes (hereinafter "edge devices") may be in communication with server 150, such as via WAN 130 or another backbone network. Any number of additional nodes (e.g., sensors, actuators, etc.) may be connected to the edge devices and communicate therewith. As would be appreciated, the network may include any number of edge devices (e.g., a first through nth edge device), each of which having any number of attached nodes/devices in its local network (e.g., sensors, actuators, etc.).

In various embodiments, an edge node may reserve local resources to perform anomaly detection functions for itself and any attached devices. For example, edge device 1 shown may reserve CPU, memory, and/or network resources, to detect and/or mitigate anomalies in its region of the network.

Figure 3B:
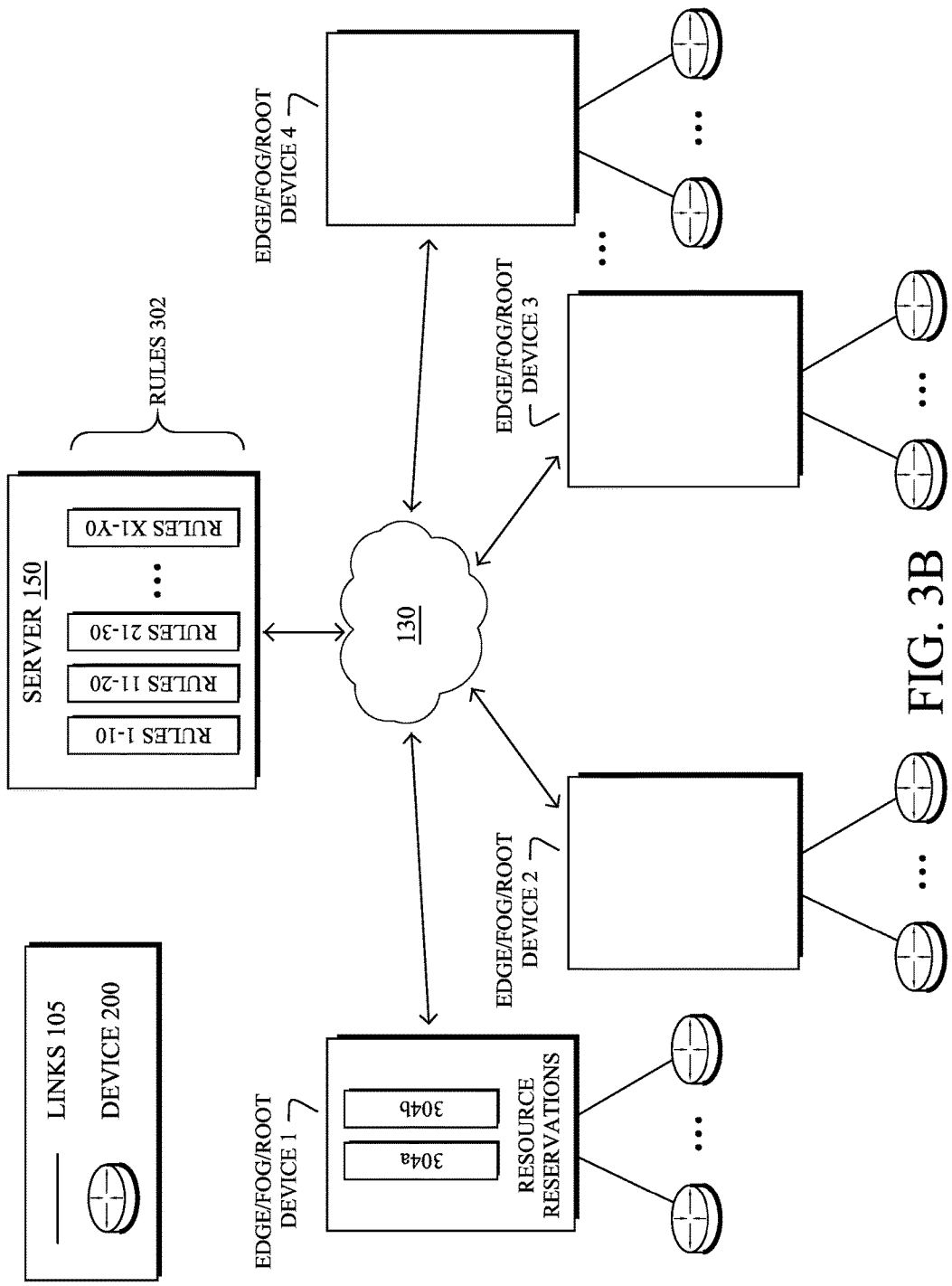

As shown in FIG. 3B, edge device 1 may divide its reserved anomaly detection resources into two groups: 1.) a first set of resources reserved for anomaly detection rules distributed by server 150 and 2.) a second set of resources reserved for peer-distributed anomaly detection rules distributed by the other edge devices 2-n. For example, edge device 1 may reserve a total set of resources $R=R_1+R_2+R_3$ . . . where $R_1$ is the reserved amount of CPU resources, $R_2$ is the reserved amount of memory, $R_3$ is the amount of reserved network resources, etc. In turn, edge device 1 may subdivide the total amount of reserved resources for anomaly detection into a first subset 304a and a second subset 304b of resources for the anomaly detection mechanism.

Figure 3C:
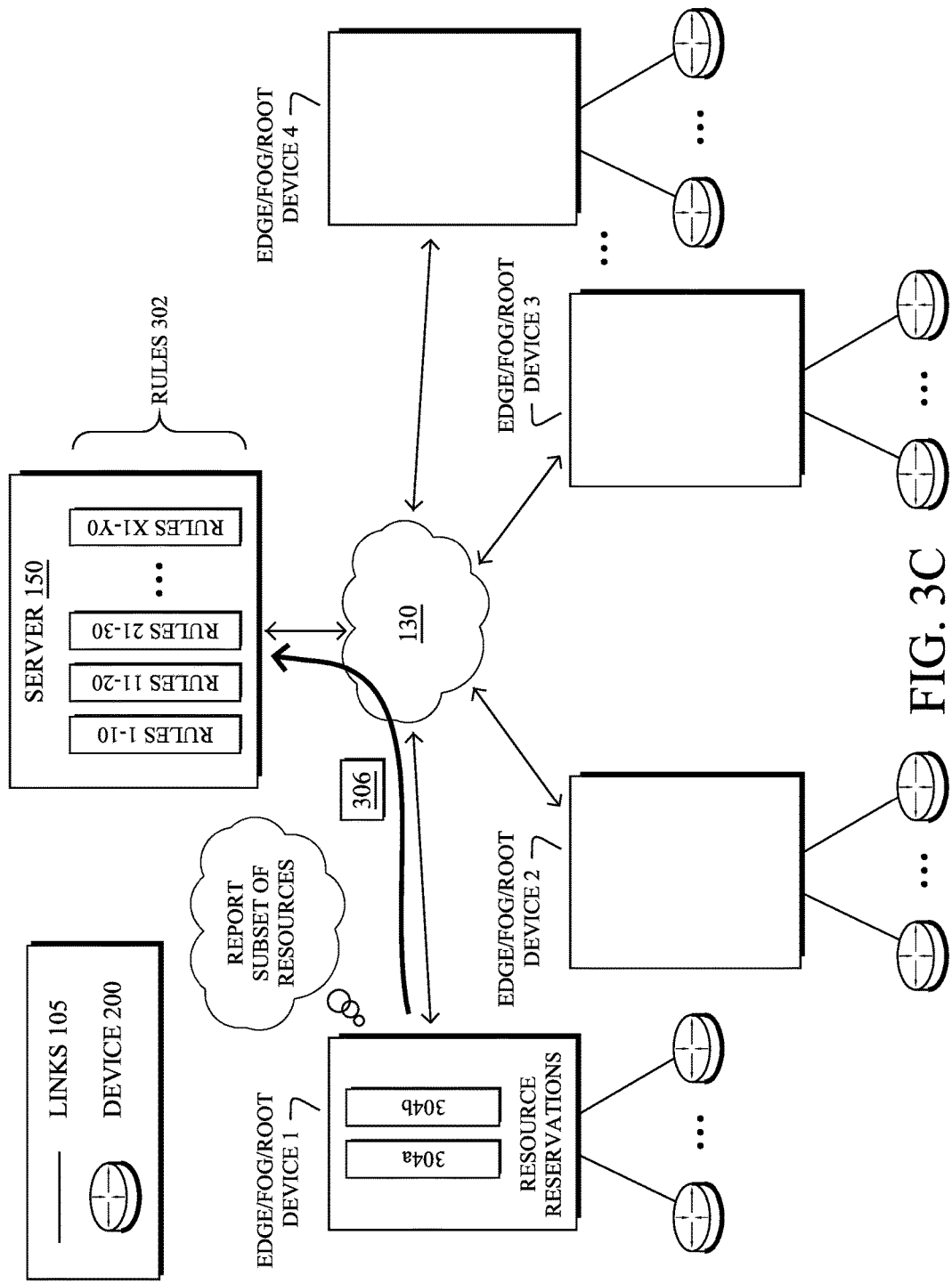

In FIG. 3C, edge device 1 may report only a subset of its total reserved resources to the supervisory device. For example, edge device 1 may send an indication 306 to server 150 that only reports the set of resource reservations in subset 304a. In other words, edge device 1 may proactively reserve the subset 304b of resources for peer-distributed rules only. The amount of resources in subset 304b reserved for peer operations may comprise a percentage P<100% of the total resources that edge device 1 reserves for anomaly detection (e.g., 50%, 33%, 25%, etc.). In one embodiment, subset 304a may comprise the majority of reserved resources and "earmarked" for application of any anomaly detection rules distributed by the supervisory node. Since the supervisory node does not have knowledge of reservation subset 304b, any allocations of these resources are left to the peer nodes (e.g., edge devices 2-n).

Figure 3D:
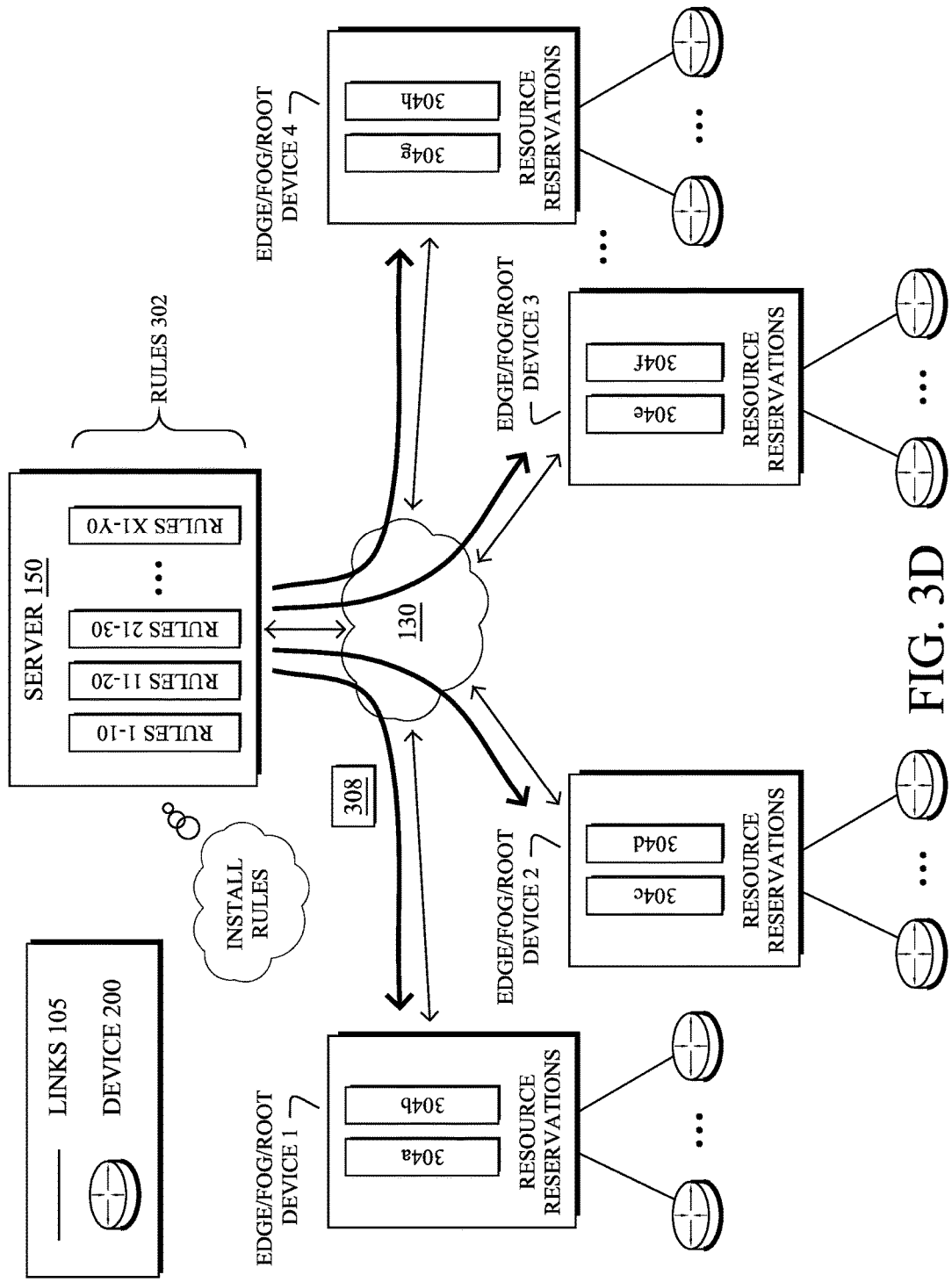

As shown in FIG. 3D, each edge device may perform similar resource reservations as edge device 1. Notably, edge nodes 1-n may devote and report resource subsets 304a, 304c, 304e, and 304g to the supervisory node, server 150. In addition, edge nodes 1-n may also retain resource reservation subsets 304b, 304d, 304f, and 304h for peer-installed anomaly detection rules.

In various embodiments, the supervisory node may distribute rules 302 to edge devices 1-n via messages 308 and based on the resources advertised by the edge devices. For example, if the supervisory device has ten rules, based on the advertised resources, the supervisory device may send three of the rules to the first edge node, four rules to the second, eight rules to the third (e.g., the three remaining rules from the initial set of ten plus an additional five rules), and then five rules to a fourth edge device. In this example, the supervisory device will have distributed the ten rules twice over a set of four edge nodes, providing redundancy and full coverage of all of the rules across the network.

Figure 3E:
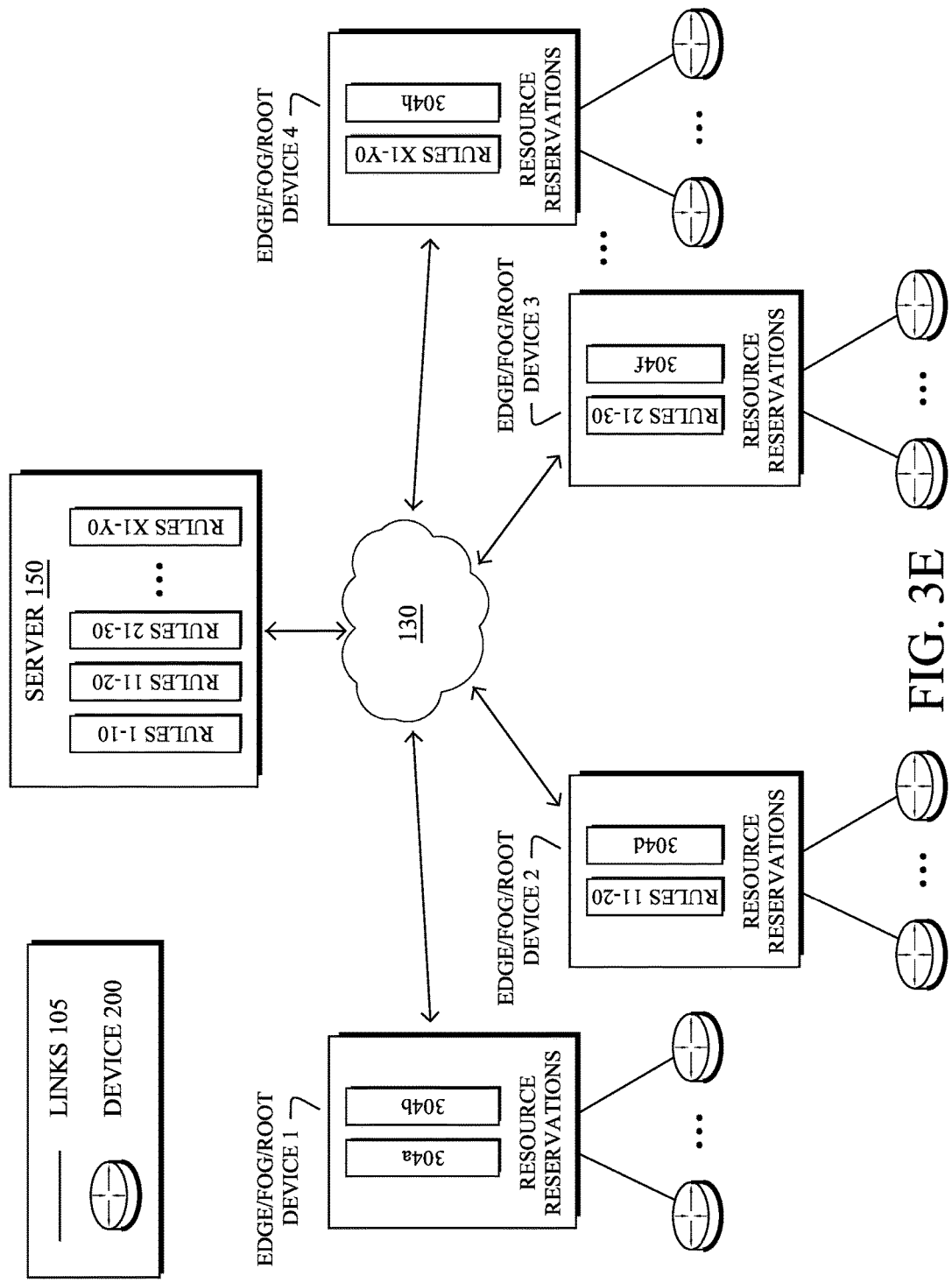

As shown, in FIG. 3E, assume that each of edge devices 1-n receives a set of rules 302 from the supervisory node. In turn, edge devices 1-n may use their respective subsets 304a, 304c, 304e, and 304g of resource reservations to install and apply the distributed anomaly detection rules 302. For example, assume that edge device 1 receives a set of one or more anomaly detection rules from server 150 that includes an attack signature for a DoS attack. In such a case, edge device 1 may use its reserved subset 304a of resources to compare its observed traffic patterns to that of the installed signature.

Figure 4A:
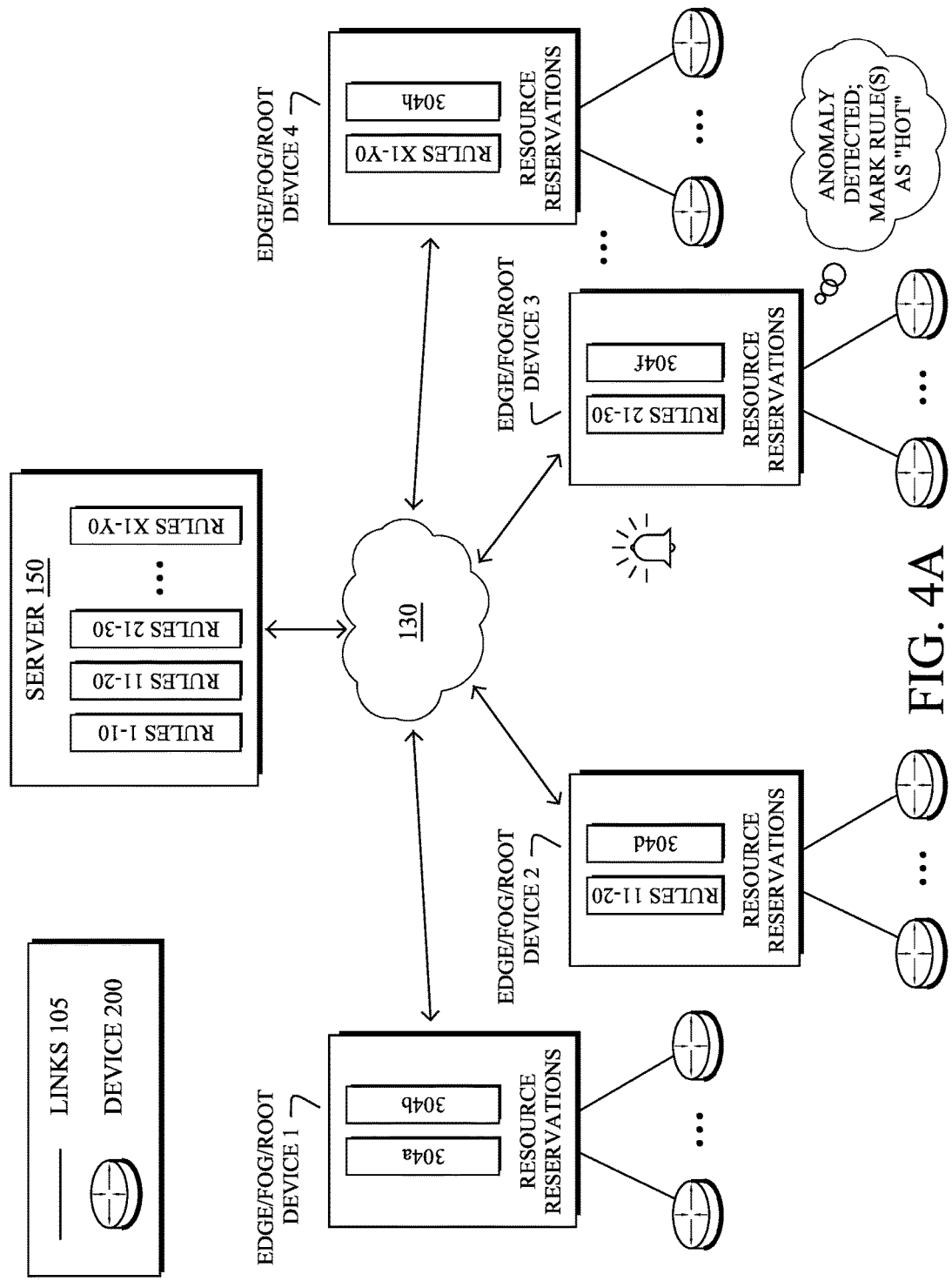
FIGS. 4A-4D illustrate examples of a peer device/node sharing anomaly detection rules in the event of a detected anomaly.

FIGS. 4A-4D illustrate examples of a peer device/node sharing anomaly detection rules in the event of a detected anomaly, according to various embodiments. As shown in FIG. 4A, assume that edge device 3 applies the anomaly detection rules from server 150 using its reserved subset 304e of resources and, in doing so, detects an anomaly. In various embodiments, in response to detecting an anomaly using one or more rules from the supervisory node, the edge device may mark the rule or set of rules as "hot." In other words, the edge device may flag or otherwise indicate that the rule or rule(s) from the supervisory node resulted in a positive hit for an anomaly.

Figure 4B:
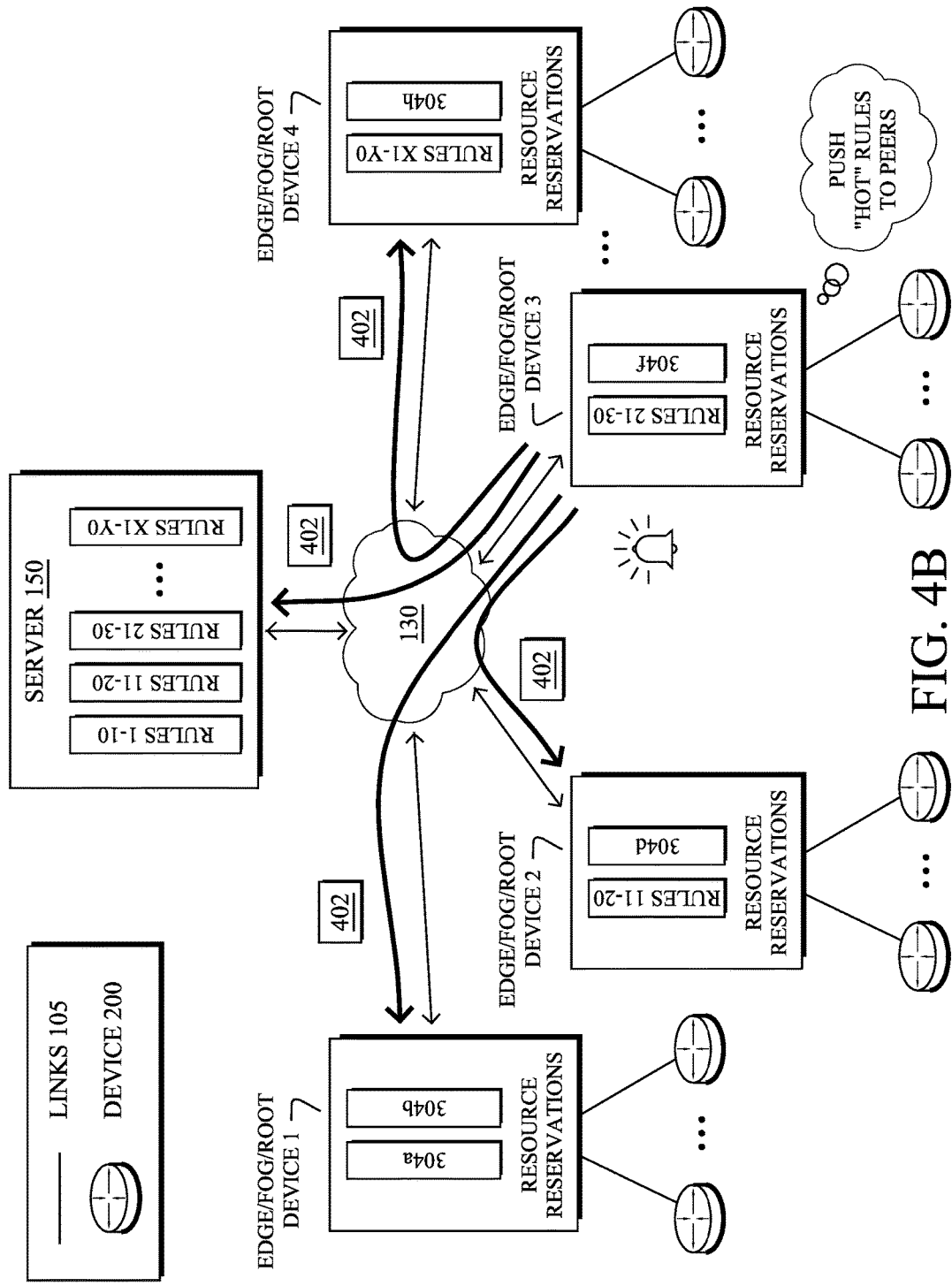

As shown in FIG. 4B, when there is a positive hit for an anomaly, the detecting edge device may distribute the corresponding rule(s) to one or more of its peers. For example, in response to edge device 3 detecting an anomaly, edge device 3 may send the responsible rules marked "hot" to edge devices 1, 2, . . . , n via messages 402. Messages 402 may be unicast or multicast messages, in various embodiments. In addition, the detecting edge device may send a notification to the supervisory device regarding the detected anomaly. For example, edge device 3 may send an alert message 404 to server 150 that indicates the type of anomaly and/or any information regarding the detection (e.g., the observation data that triggered the anomaly detection, etc.).

Figure 4C:
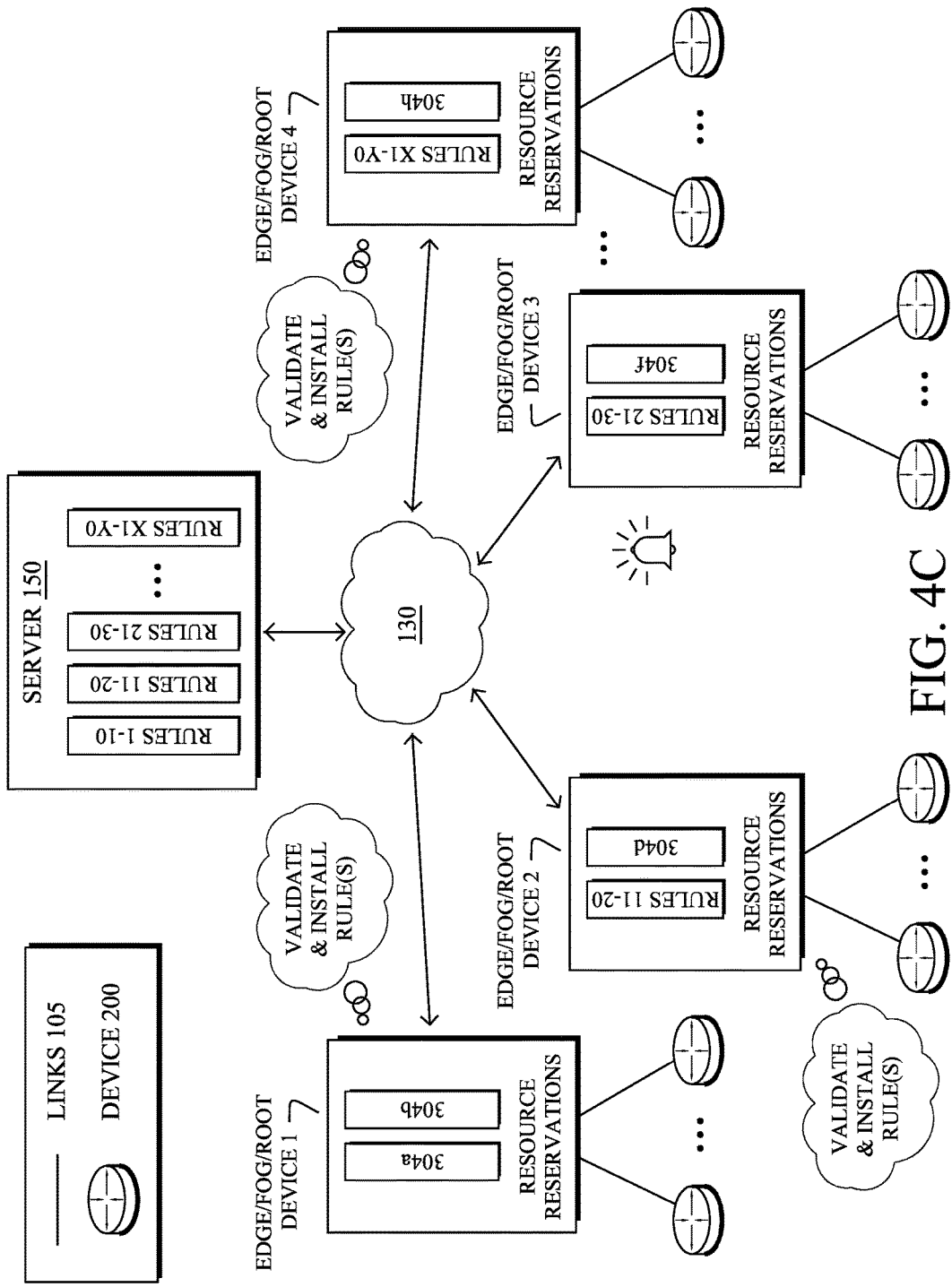

As shown in FIG. 4C, each edge device that receives a set of anomaly detection rules from a peer (as opposed to the supervisory node), may validate the received set before applying the received rules. For example, in response to receiving messages 402 from edge device 3, edge devices 1-2, n may validate the rules before installing and applying the rules. In one embodiment, the edge nodes may use an MD5-based validation mechanism (e.g., by inclusion of an MD5 hash in messages 402), to ensure that a peer-distributed set of rules was sent by an authorized and legitimate device. Other validation mechanisms can be used in other embodiments, to prevent a malicious node from installing rules onto an edge device. For example, server 150 may distribute digital certificates to the edge devices that a receiving device can use to validate the sender of any peer-distributed anomaly detection rules. The devices use similar security mechanisms, to ensure that the rules distributed by the supervisory node were indeed sent by the supervisory node and not a malicious node.

Figure 4D:
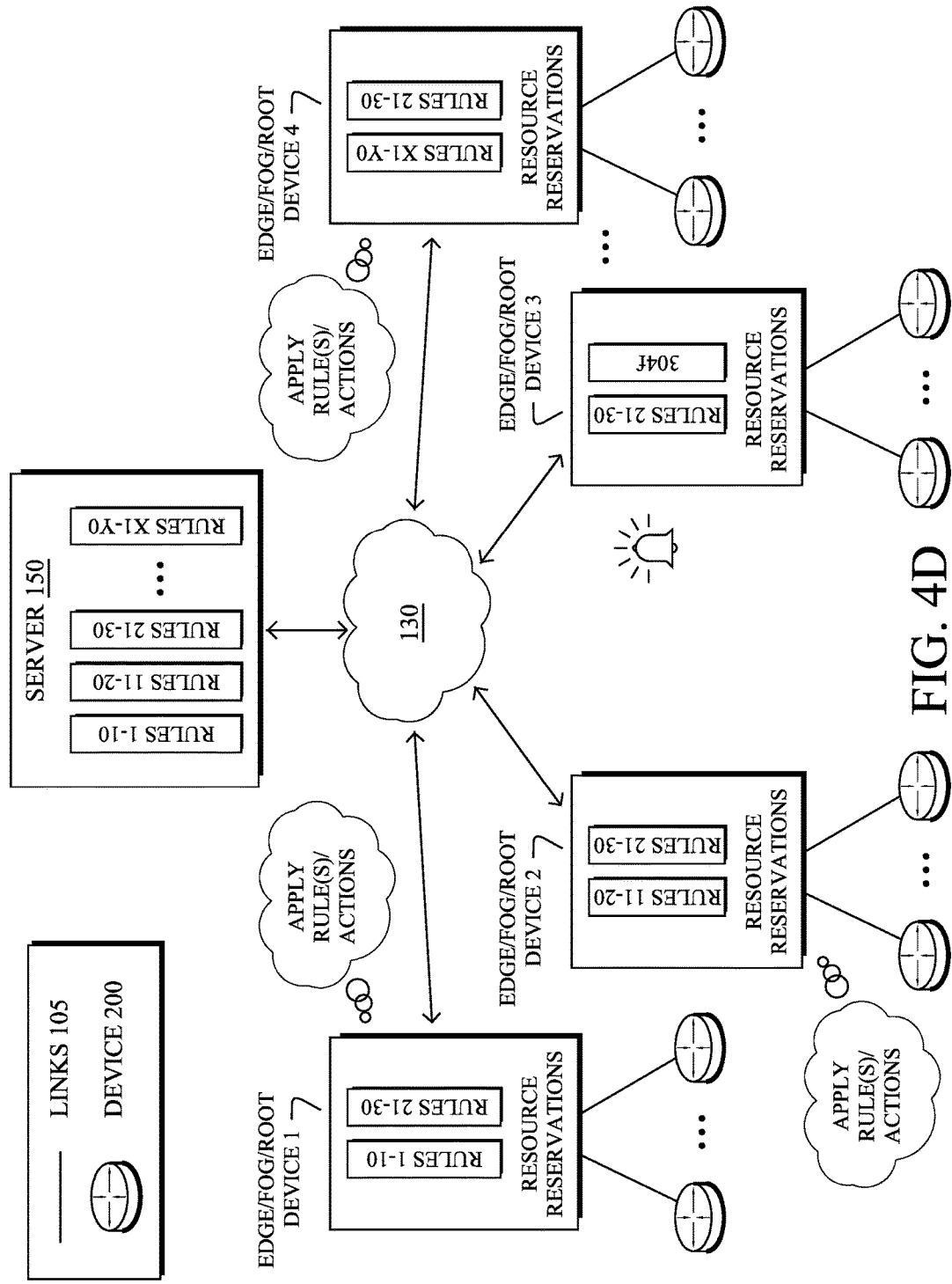

As shown in FIG. 4D, once the peer devices have validated the "hot" rule(s), they may install/apply the received rules using their resources reserved for peer-distributed rules. For example, edge device 1 may use subset 304*b* of its reserved resources to apply the "hot" rules that it received from edge device 3. Conversely, if the peer-distributed rule(s) fail validation, the receiving device may discard the received rules and/or raise a security alert (e.g., to server 150), indicating a potential attack.

The peer-distributed rules, like the supervisory-distributed rules, may have any number of associated actions. For example, a particular rule may instruct the device that applies the rule to change its power state (e.g., move to a low power state, etc.), increase or decrease sensitivity of a given sensing element, wake up from sleep, drop or shape traffic, or perform any number of other actions. In cases in which a "hot" rule is distributed among peers, the hot rule may cause the receiving device to simply perform the action (e.g., in an unconditioned manner). In other cases, the rule may include a condition that must be met before the device performs the associated action.

In one example of operation of the techniques herein, consider the case in which a fence mounted sensor detects motion using an anomaly detection rule. In response to detecting motion, the device may send the rule to adjacent sensors, to see if the other sensors can detect and isolate the exact location of the motion. Particularly, if the fence mounted sensor executes a detection rule, it may send one or more "hot" rules to the other sensors, to initiate further intrusion detection and prevention actions. As would be appreciated, non-homogenous fog nodes may have different sensors and may perform very different and specific roles, which may depend on the roles/operations of the other nodes. In this case, a fog device that has not detected a particular event within a threshold amount of time may notify its dependent nodes to move to a low power state, until the first fog device detects an event that warrants action by the dependent nodes (e.g., enable their sensors, take other actions, etc.).

Figure 5:
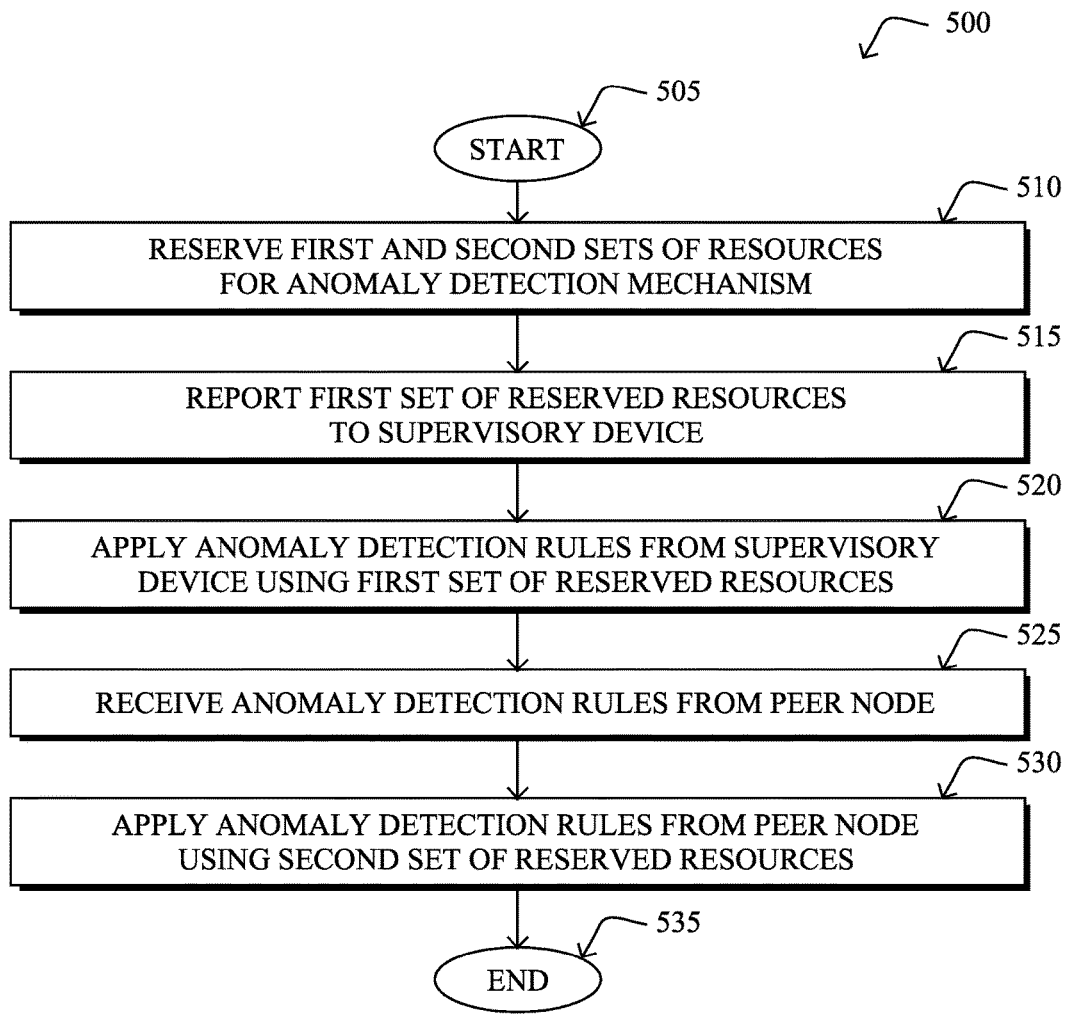
FIG. 5 illustrates an example simplified procedure for applying anomaly detection rules.

FIG. 5 illustrates an example simplified procedure for applying anomaly detection rules in accordance with one or more embodiments herein. In some embodiments, a specialized network device/node (e.g., a fog device/node at the edge of a local network, etc.) may perform procedure 500 by executing stored instructions. The procedure 500 may start at step 505 and continues on to step 510 where, as described in greater detail above, the device reserves first and second sets of resources for an anomaly detection mechanism. In some cases, the device itself may be configured to detect anomalies using the reserved resources. In other cases, however, the device may simply perform anomaly mitigation or prevention steps, in response to another device detecting an anomaly. The reserved resources may comprise processing power, memory space, network resources, or the like. Generally, the first set may be associated with the application of anomaly detection rules provided by a supervisory device, whereas the device may reserve the second set of resources for application of 'hot' rules provided by peers of the device (e.g., other fog devices). The amount of reserved resources between the first and second sets may be equal or may vary. For example, the device may reserve the first and second sets of resources according to a parameter that controls the proportion of the reservations.

At step 515, as detailed above, the device may report only the first set of reserved resources to the supervisory device. Notably, the device may conceal its additional resource reservations in the second set from the supervisory device. In doing so, the supervisory device will be forced to make rule deployment decisions based solely on the reported first set of reserved resources.

At step 520, the device may apply one or more anomaly detection rules from the supervisory device using the first set of reserved resources, as described in greater detail above. In some cases, the supervisory-provided anomaly detection rule(s) may cause the device to perform anomaly detection functions. For example, a given rule may cause the device to begin assessing certain information regarding the network, the state of the device, and/or user activity (e.g., device resources, network traffic behavior, system settings, etc.). A given rule may also cause the device to perform an associated action, if a condition is met. For example, if the device detects a particular traffic patterns that indicates anomalous activity, the device may take proactive measures such as raising alerts, dropping traffic, performing traffic shaping, or the like.

At step 525, as detailed above, the device receives one or more anomaly detection rules from a peer node. For example, if the device is a device in the fog, another fog device may send a 'hot' rule to the device in response to the peer node detecting an anomalous condition.

At step 530, the device may apply the one or more peer-provided anomaly detection rules using the second set of reserved resources, as described in greater detail above. As noted previously, anomaly detection rules may include associated actions and may be unconditioned, in some cases. For example, one 'hot' rule from a peer node may simply cause the device to perform an anomaly mitigation or prevention action, without requiring the device to identify an anomalous condition. In other cases, the peer-provided rule may cause the device to begin performing its own anomaly detection functions (e.g., by analyzing sensor data, performing a self-assessment routine, etc.). In turn, if the device detects an anomaly, the device may perform the action associated with the rule. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a rule distribution mechanism for devices with constrained resources that allows for the optimal use of resources by reserving a portion of the resources for peer-to-peer advertisement and validation of "hot" rules. This is crucial in LLN applications, such as IoT applications, which typically use devices with very constrained power and computational resources. Notably, the techniques herein leverage fog-level devices to rapidly disseminate a detected rule and its associated action, to validate the authenticity of peer rules, to monitor and analyze both user and system activity, to analyze system configurations and vulnerabilities, to track user policy violations, to identify known attack patterns, to analyze abnormal activity patterns, and perform other such functions.

While there have been shown and described illustrative embodiments that provide for the application and dissemination of anomaly detection/mitigation rules in a network, it is to be understood that various other adaptations and modifications may be made within the spirit and scope of the embodiments herein. For example, the embodiments have been shown and described herein with relation to certain network configurations and topologies. However, the embodiments in their broader sense are not as limited, and may, in fact, be used with other types of networks.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    reserving, by a fog device in a network, first and second sets of local resources for an anomaly detection mechanism;
    reporting, by the device, the first set of local resources to a supervisory node;
    in response reporting the first set of local resources, receiving, from the supervisory node at the device, one or more anomaly detection rules;
    applying, by the device, the one or more anomaly detection rules from the supervisory node using the first set of reserved resources;
    receiving, by the device, one or more anomaly detection rules from a peer node in the network, wherein the one or more anomaly detection rules received from the peer node are sent in response to the peer node detecting an anomaly using the one or more anomaly detection rules; and
    applying, by the device, the one or more anomaly detection rules from the peer node using the second set of reserved resources by:
        detecting an anomalous condition using the one or more anomaly detection rules from the peer node, and
        performing an action associated with the one or more anomaly detection rules from the peer node, in response to detecting the anomalous condition.

2. The method as in claim 1, further comprising:
    validating, by the device, the one or more anomaly detection rules received from the peer node, prior to applying the one or more anomaly detection rules received from the peer node.

3. The method as in claim 1, wherein the anomalous condition comprises at least one of: a user policy violation, an anomalous sensor reading, an anomalous traffic flow pattern, or a system status of the device.

4. The method as in claim 1, wherein applying the one or more anomaly detection rules from the peer node using the second set of reserved resources comprises:
    performing, by the device, an action associated with the one or more anomaly detection rules from the peer node, wherein the one or more anomaly detection rules are unconditioned rules specifying the action.

5. The method as in claim 4, wherein the action comprises moving the device to a lower power operational state.

6. The method as in claim 1, further comprising:
    detecting, by the device, an anomaly using the one or more anomaly detection rules from the supervisory node; and
    providing, by the device, the one or more anomaly detection rules from the supervisory node to the peer node, in response to detecting the anomaly.

7. The method as in claim 1, wherein the device comprises a router at an edge of the network.

8. An apparatus, comprising:
    one or more network interfaces to communicate with a network;
    a processor coupled to the network interfaces and configured to execute one or more processes; and
    a memory configured to store a process executable by the processor, the process when executed operable to:
        reserve first and second sets of local resources for an anomaly detection mechanism;
        report the first set of local resources to a supervisory node in the network;
        in response reporting the first set of local resources receive from the supervisory node at the device one or more anomaly detection rules;
        apply the one or more anomaly detection rules from the supervisory node using the first set of reserved resources;
        receive one or more anomaly detection rules from a peer node in the network, wherein the one or more anomaly detection rules received from the peer node are sent in response to the peer node detecting an anomaly using the one or more anomaly detection rules; and apply the one or more anomaly detection rules from the peer node using the second set of reserved resources by:
- detecting an anomalous condition using the one or more anomaly detection rules from the peer node, and
- performing an action associated with the one or more anomaly detection rules from the peer node, in response to detecting the anomalous condition, wherein the apparatus is a fog device.

9. The apparatus as in claim 8, wherein the process when executed is further operable to:
validate the one or more anomaly detection rules received from the peer node, prior to applying the one or more anomaly detection rules received from the peer node.

10. The apparatus as in claim 8, wherein the anomalous condition comprises at least one of: a user policy violation, an anomalous sensor reading, an anomalous traffic flow pattern, or a system status of the apparatus.

11. The apparatus as in claim 8, wherein the apparatus applies the one or more anomaly detection rules from the peer node using the second set of reserved resources by:
performing an action associated with the one or more anomaly detection rules from the peer node, wherein the one or more anomaly detection rules are unconditioned rules specifying the action.

12. The apparatus as in claim 11, wherein the action comprises moving the apparatus to a lower power operational state.

13. The apparatus as in claim 8, wherein the process when executed is further operable to:
- detect an anomaly using the one or more anomaly detection rules from the supervisory node; and
- provide the one or more anomaly detection rules from the supervisory node to the peer node, in response to detecting the anomaly.

14. The apparatus as in claim 8, wherein the apparatus comprises a router at an edge of the network.

15. A tangible, non-transitory, computer-readable media having software encoded thereon, the software when executed by a processor on a fog device in a computer network operable to:
- reserve first and second sets of local resources for an anomaly detection mechanism;
- report the first set of local resources to a supervisory node in the network;
- in response reporting the first set of local resources receive from the supervisory node at the device one or more anomaly detection rules;
- apply the one or more anomaly detection rules from the supervisory node using the first set of reserved resources;
- receive one or more anomaly detection rules from a peer node in the network, wherein the one or more anomaly detection rules received from the peer node are sent in response to the peer node detecting an anomaly using the one or more anomaly detection rules; and
- apply the one or more anomaly detection rules from the peer node using the second set of reserved resources by:
  - detecting an anomalous condition using the one or more anomaly detection rules from the peer node, and
  - performing an action associated with the one or more anomaly detection rules from the peer node, in response to detecting the anomalous condition.

* * * * *